United States Patent [19]
Manthey

[11] Patent Number: 5,367,449
[45] Date of Patent: Nov. 22, 1994

[54] ARTIFICIAL INTELLIGENCE SYSTEM

[76] Inventor: Michael Manthey, Myrdalstraede 273, 9220 Aalborg 0, Denmark

[21] Appl. No.: 889,833

[22] Filed: May 27, 1992

[51] Int. Cl.[5] .................. G05B 11/01; G05B 13/02
[52] U.S. Cl. ................................ 364/152; 364/141; 395/20
[58] Field of Search .............. 364/141, 152; 395/51, 395/905, 20, 81

[56] References Cited

U.S. PATENT DOCUMENTS

| | | | |
|---|---|---|---|
| 4,608,628 | 8/1986 | Saito et al. | 364/141 |
| 4,642,760 | 2/1987 | Yanai et al. | 364/143 |
| 4,829,450 | 5/1989 | Manthey | 395/905 |
| 4,858,102 | 8/1989 | Lovrenich | 364/136 |
| 4,885,677 | 12/1989 | Heilman et al. | 364/184 |
| 5,195,029 | 3/1993 | Murai et al. | 364/184 |

OTHER PUBLICATIONS

Topsy, "A Distributed Hierarchical Planner Based on Concurrent Sensory Inputs", Master's Thesis in Computer Science, Frandsen et al., Jun. 1991.

Primary Examiner—Paul Gordon
Attorney, Agent, or Firm—Ogram & Teplitz

[57] ABSTRACT

An artificial intelligence system which utilizes a unique technique for storing data, analyzing data, and reducing the complexity of data is disclosed. The technique involves identifying "world" states that have a unique exclusive relationship. The identification of these unique states considerably reduces the complexity of the world under study. Furthermore, the identified unique states are useful in combination with any way the system has to affect the world under study. These identified unique states, when placed in a hierarchical scheme, further reduces the complexity of the world under study.

25 Claims, 5 Drawing Sheets

| A | B | A xor B | not (A xor B) |
|---|---|---------|---------------|
| + | + | − | + |
| + | − | + | − |
| − | + | + | − |
| − | − | − | + |

ARTIFICIAL INTELLIGENCE SYSTEM

BACKGROUND OF THE INVENTION

This invention relates generally to Artificial Intelligence (AI), and more specifically to planning systems capable of operating in a distributed processing environment.

Artificial intelligence, or AI, deals with the science of making machines with the intelligence of human beings. AI covers areas including cognition, understanding, learning, knowledge representation and searching. This invention touches on all of these aspects of AI.

The idea of making a machine with the intelligence of a human being has existed since at least the 1940's when the first computers were made. Many predictions have been made since then as to when an intelligent machine will be created. Most of these predicted dates have come and gone and there is still no evidence that an intelligent machine will be created in the near future.

The field of AI has gone through several periods when great breakthroughs were thought to be close at hand. However, each time, more barriers were found that frustrated the goal of creating an intelligent machine. These barriers included the exponential growth of the search space, consequent slowness in the search process, inability to generalize knowledge, and encoding and storing knowledge in a useful and efficient way. These problems apply to the AI field in general.

One subcategory of AI systems is planners. A planner can be thought of as a system for searching through a space of possible world states for a path to a particular world state (a goal state) which satisfies a number of externally or internally imposed criteria. An example would be a system for searching through the states of the familiar Rubic's Cube puzzle to find the sequence of operations to achieve the goal state (i.e. the solution). There are various strategies for solving these planning problems. Two of these strategies are the standard planners and the hierarchical planners.

A standard planner is a planner which develops plans at a single abstraction level, typically by developing a set of subgoals to be achieved in order to reach the main goal. A hierarchical planner is a planner which develops plans at several levels of abstraction. The plan at the highest level is a simplification, whereas at the lowest level it is a detailed plan, ready for execution.

Planners face barriers similar to the barriers other AI systems face and which were discussed above. These include an exponentially growing search space, consequent slowness in planning, inability to generalize knowledge from previously generated plans, and difficulty in encoding knowledge in a domain independent way.

Another problem faced in the field of AI and planners is the lack of techniques for producing programs which can control a number of activities in a distributed fashion. Distributed processing is when multiple processors or computers are connected together so that they can work on a common problem. Distributed processing has the advantage of greatly increasing the computing power of a system merely by adding additional processors. A technique that can utilize this increased computing power is a great advantage.

Therefore, a need exists for a new technique to overcome these problems in the AI and planning fields.

SUMMARY OF THE INVENTION

The invention is an artificial intelligence system which utilizes a unique technique for storing data, analyzing data, and reducing the complexity of data. The technique involves identifying "world" states that have a unique exclusive relationship. The identification of these unique states considerably reduces the complexity of the world under study(here after called the world). Furthermore, the identified unique states are useful in combination with any means the system has to affect the world. Finally, the disclosure shows a technique for combining these identified unique states in a powerful hierarchical scheme which further reduces the perceived complexity of the world.

The new technique of the invention is called "co-exclusion". In very general terms, co-exclusion is the identification of states that are consistent over time. More specifically, it is the identification of sets of (observed) states having a certain very general property, which property allows the inference of a causal relationship between said states. As a result, the disclosure provides a method for inferring actions through which the program can affect the world in which it is embedded.

It is helpful to have a concrete example in explaining the invention. The following discussion is directed to a machine that has at least two eye type sensors and at least one hand type actuator for affecting the world.

The first use of the co-exclusion technique is its ability to separate relevant data from redundant data. In systems with sensor inputs, the majority of data received is either redundant or irrelevant. The co-exclusion technique provides a useful technique for identifying the useful data and for encoding it in a useful way. The irrelevant data can then be discarded or ignored. This allows more relevant data to be stored and makes a search much faster. This use of the co-exclusion technique is described below.

The system's sensors generate state-signals which are indicative of the state of the world. The sensor's may be either real or simulated (e.g. the "world" could be an artificial world simulated inside the system). New state-signal data is generated every time frame, although the system need only remember new co-occurrences of data. These state-signals typically represent snapshots of the state of the world during a certain time frame. The technique initially requires searching the state-signal data through all prior time frames. The search looks for state-signals which are co-exclusive (i.e. states which do not occur simultaneously in the same time frame). This can be demonstrated using the example of a simple block world commonly used in the art. Assume there exists a single block and two hands, 1 and 2. Further assume the block may only be in one hand at a time. In one time frame, the co-occurring state-signals would then be (hand1,empty) and (hand2,full); in another time frame, the co-occurring data would be (hand1,full) and (hand2,empty). These two pairs of co-occurrences are co-exclusive in a very clear way: within each co-occurrence, the sensors have opposite values, and this oppositeness is reversed in the other frame. Hence, the co-exclusion of states captures the fact that the block cannot be in both hands simultaneously. Although this is intuitively clear to human beings, the co-exclusion technique enables a computing system to learn this fundamental relationship.

Actually, the two co-occurrences (hand1,empty), (hand2,empty) and (hand1,full), (hand2,full) also represent a co-exclusion, although the "intuition" is less obvious. For example, it might be that the sensor for hand2 is simply connected "backwards", such that its "empty" means the same as hand1's "full". However, the inference might also be interpreted to mean that it is possible in the world for two blocks to appear and disappear.

Ultimately, the co-exclusion criterion is that at least two of the sensor values, in tuples containing the same set of sensors, must have changed between the two frames. This is sufficient to determine the necessary mathematical property called "anti-commutativity" between the two pairs of tuples. (Reference: "Space-Time Algebra" by D. Hestenes, Published by Gordon & Breach, 1966.) It follows that two co-exclusion-related tuples together form/describe an action, and this action, in the form of a recording of the-associated tuples, is recorded by the system. Returning to the original single block example, the system can then (attempt to) cause hand to be empty by filling hand2, or (equivalently) cause hand2 to become full by emptying hand1. Since there is only one block and two places in the world (of this action), doing half of the transformation is tantamount to causing the other half to occur.

A computing system can use the co-exclusion technique when examining the past history of the world as it has data of it for pairs, triples, etc. (or in general n-tuples) of co-exclusive state-signals. Over time, the computing system would identify all of the co-exclusive state-signals that exist. These co-exclusive state-signals are saved and the extraneous data is deleted, resulting in a reduction in the amount of data to be stored. This demonstrates one of the uses of the co-exclusion technique, namely the identification and reduction of useful data concerning the world under study.

Some of the advantages of the co-exclusion technique include the ability to separate relevant data from irrelevant data, store data in an efficient and useful way, allow the inference and formation of actions, allow data to be combined in a useful hierarchical manner, and allow all the preceding to be done in a distributed processing environment. The result is an improvement in the state of the art of intelligent machines and a general improvement in the speed of the computations.

Another advantage of the co-exclusion technique is the use of the sets of co-exclusive state-signals which are created as described above to infer the existence of actions. An action is anything that can affect the world under study. An example would be a mechanical hand to move a block and which is controlled by the planning system itself. It could also be something not under control of the planning system or even a random occurrence. Once a set of co-exclusive state-signals is created, the set is useful to infer the existence of an action that is possible in the world. For example, in the block world described above, the two co-exclusive states of 1) block in hand 1, and 2) block in hand 2, indicate that there is some action that at some time in the past moved the block from hand 1 to hand 2 or vice versa. With this knowledge the planning system creates an "action object" consisting of this information. In essence, the system "learns" that it can modify the world. As will be shown below, these primary action objects are then combined in a hierarchical manner to form complex action objects. The co-exclusion technique makes the creation of the hierarchical structures efficient to create and maintain.

Another advantage of the co-exclusion technique is its ability to be used on a distributed processing system. As previously stated, a distributed processing system consists of multiple processors which can communicate with each other. The co-exclusion technique makes this possible by forming sets of co-exclusive state-signals and action objects in a decentralized fashion without the need for a priori knowledge about anything. They also are created in a way that the objects automatically come to interact in a decentralized fashion.

In the preferred embodiment the communication between processors would be done via a shared memory between the several processors. Each processor has access to the shared memory. When state-signals are received they are put in the shared memory. Any actions the system forms are also put in the shared memory. Because these are self contained packets of information, any processor may be used to process them; therefore, any processor at any time could be searching for co-occurring state-signals and searching for co-excluding sets of co-occurring state-signals and actions so that action objects are created.

For a good overview of artificial intelligence and its implementation refer to "Topsy, A Distributed Hierarchical Planner Based on Concurrent Sensory Inputs" by Peter Frandsen and Carsten Boe Jensen and supervised by Michael Manthey. It is a Master's Thesis done at the University of Aalborg, Denmark, published in June 1991, incorporated hereto by reference.

The inventions together with various embodiments thereof will be more fully explained by the accompanying drawings and the following descriptions.

BRIEF DESCRIPTION OF THE DRAWINGS

FIG. 10 shows the Boolean function not-exclusive-or.

DESCRIPTION OF THE PREFERRED EMBODIMENT

Figure 1:
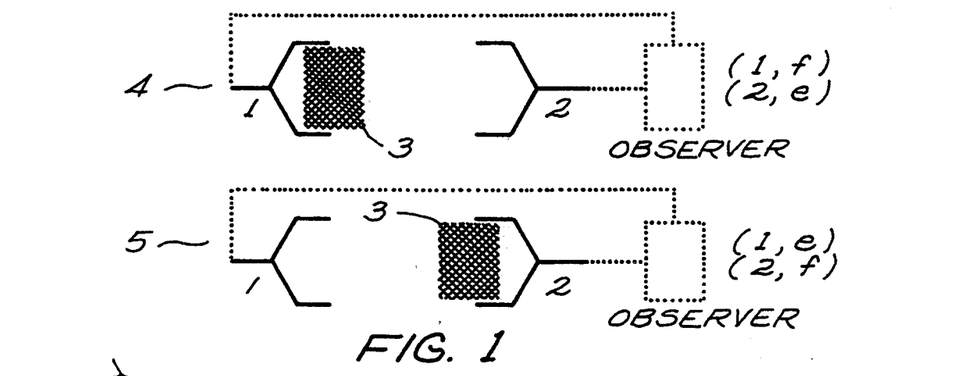
FIG. 1 shows a simple block world.

FIG. 1 represents a simple block world. It has two hands 1 and 2 and a single block 3. The block can move between the hands as shown in 4 and 5. In addition to the hands and the block, there are sensor means (not shown) for each hand that can sense the state of each hand (i.e. empty or full). The state-signals created from these sensor means are represented as:

(1,e) - hand 1 empty;
(1,f) - hand 1 full;
(2,e) - hand 2 empty; and
(2,f) - hand 2 full The tuples (1,e) and 1,f) cannot co-occur, since they imply that the hand is in two different states simultaneously; the same applies to (2,e) and (2,f). In a world with a single block, (1,e) and (2,f) could co-occur, as could (1,f) and (2,e). These two co-occurrences would, as described earlier, satisfy the co-exclusion criteria, and trigger the formation and remembering of an action which describes the movement of the block (or whatever) between hand 1 and hand 2. Depending on the world, (1,e) and (2,e) could also co-occur, since it is possible that the block has 'disappeared'. Similarly, (1,f) and (2,f) could co-occur if the world suddenly causes a second block to appear. These two co-occurrences would also, as described earlier, cause the formation and remembering of a different causal relationship in the world, one describing the movement of two blocks. These two actions apply however to two different situations, and in no way contradict each other.

The tuples (1,e) and (2,f) are co-occurrences since they occur simultaneously. Together they form the pairwise co-occurrence (1,e),(2,f). Likewise the tuples (1,f) and (2,e) are also co-occurrences and together they form the pairwise co-occurrence (1,f),(2,e). These two pairwise co-occurrences are:

(1,e),(2,f) and (1,f),(2,e)

Each of these pairwise co-occurrences represent the state of the block world at a certain instant in time.

It should be obvious that the two states represented by the co-occurrences are mutually exclusive. They can not exist simultaneously. They "exclude" each other. Each of these pairwise co-occurrences exclude the other because the individual co-occurrences exclude the co-occurrence of the other pairwise co-occurrence.

For example, (1,e) excludes both (1,f) and (2,e). Similarly (2,f) excludes (1,f) and (2,e). This relationship implies that there exists an action that can effect the change in state (i.e. move the blocks between the hands).

From this the following postulate is formed:
Pairwise co-occurrences that exclude each other imply the existence of an action.
This is known as co-exclusion.

Figure 2:
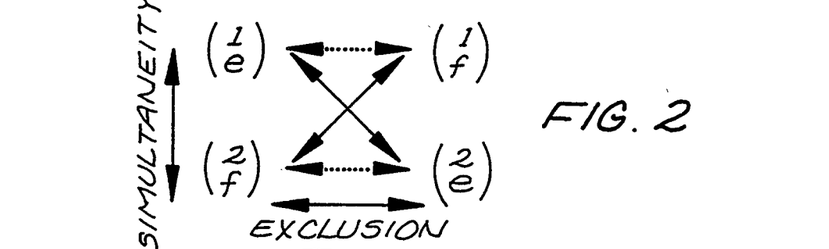
FIG. 2 is a state transfer diagram showing simultaneity and exclusion for a simple block world.

FIG. 2 shows the simultaneity and exclusion relationship discussed above. The two pairwise co-occurrences that are possible each exclude the other because the primitive co-occurrences from which they are built exclude each other. The tuple (1,e) excludes both (1,f) and (2,e). Likewise, (2,f) excludes both (1,f) and (2,e).

Figure 3:
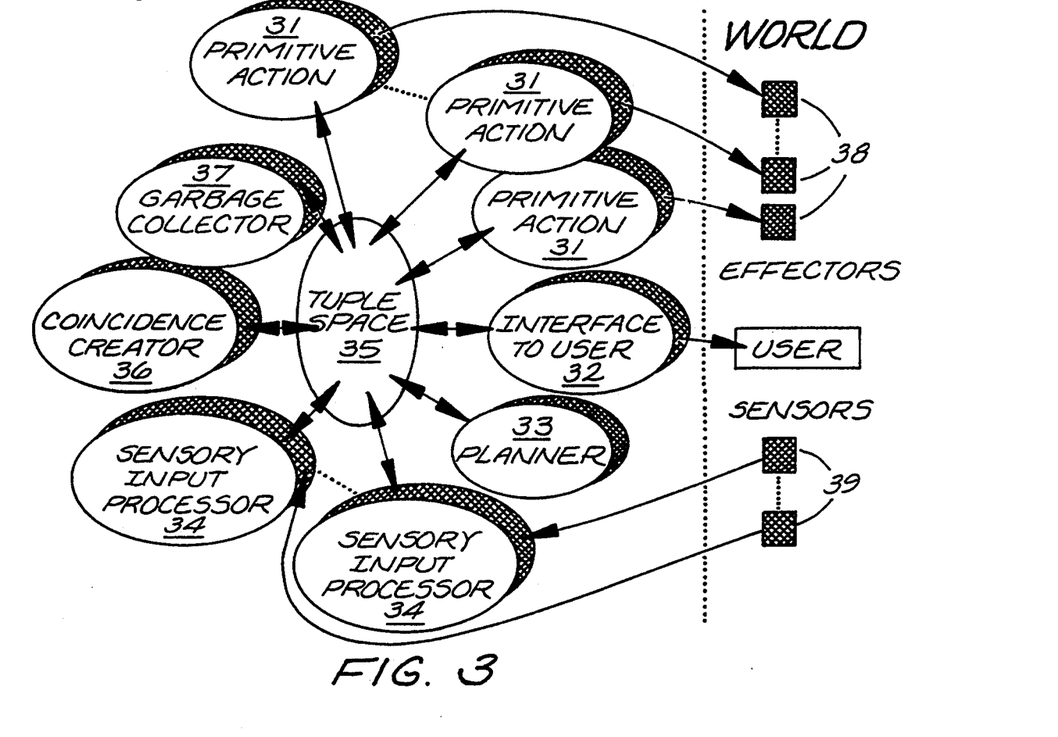
FIG. 3 is a diagram of the preferred embodiment of the invention showing the interaction of the major components.

FIG. 3 is a diagram of the preferred embodiment of the invention showing the major components of the system and the interaction with the world. The actions 31 represent the lowest level of actions or commands found when the system is initialized. These could be equated with an action such as open hand or close hand. The user interface 32 passes data to a user and inputs data from the user. This gives the user the opportunity to observe how the system is working and to modify the system if needed.

Planner 33 is where the plan is developed. A planner can be described as consisting of complex actions which, in a distributed fashion, cooperate in producing a sequence of actions which achieve the goal. Planners need to represent actions in order to function at all, and if one wants a planner that learns from experience, then this disclosure indicates how one can infer actions from sensory experience.

The sensor input processors 34 create tuples indicative of the sensor means' state. Such sensory data tuples are the elements of the co-occurrences discussed earlier, and are placed into the tuple space, or shared memory 35.

The Coincidence Creator 36 creates co-occurrence objects. Co-occurrence objects are data objects that "remember" when two (or more) states have occurred simultaneously. These objects are also stored as tuples in the shared memory 35.

The Garbage Collector 37 searches for discarded or useless tuples in the shared memory 35. This is an important function since it keeps the number of tuples in the shared memory 35 as low as possible and thus minimizes search time. A discarded tuple is created, for example, when a certain co-occurrence object already exists and therefore already represents a new tuple put into the shared memory 35. The shared memory or tuple space 35 serves as both a data storage area and a communications medium for the several processes. One skilled in the art can readily see how this is adaptable to a distributed processing system.

Effectors 38 represent anything controllable by the system that can affect the world under study. An example of an effector is a mechanical hand. The sensors means 39 send state-signals indicative of their state to the system. They send data to the system concerning the state of the world under study. An example of a sensor means is a mechanical eye.

Figure 4:
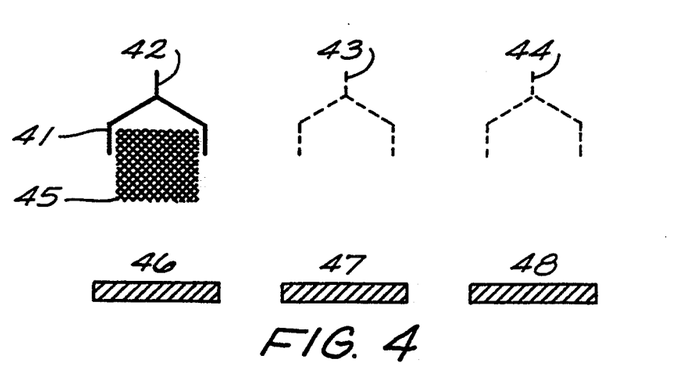
FIG. 4 shows a more complex block world.

FIG. 4 shows a simple block world that is used in the following discussions. Hand 41 is moved between positions 42, 43, and 44. Hand 41 can pick up and drop the block 45 onto the locations 46, 47, and 48. The system receives the following sensory inputs:
(41,f) - there is a block in the hand
(42,f) - position 42 is filled with the hand
(46,e) - location 46 is empty These tuples occur simultaneously so the system will create a co-occurrence of: (41,f), (42,f), (46,e). This does not do anything by itself. It merely represents a state of the world that the system has observed.

If the hand 41 drops the block 45 then the following co-occurrence will be created: (41,e),(42,f),(46,f). The system has now observed that an action has taken place in the world, but this action is not (yet) explicitly present in its representation. The system has just memorized the two situations that it has observed. These two "coincident objects" together represent a possible action. They should try to "find" each other and combine to form a larger object. The system does this by checking if the two objects exclude each other, i.e. if they are co-exclusive. If they exclude each other the system knows that they can not exist simultaneously and it must therefore assume that there is an action (or sequence of actions) that leads from one world state to the other and vice versa. The system must assume that such an action exists because it has observed both states, and if the observations are correct then there must be a way to get from one state to the other—after all, it has happened in the environment.

Based on this discussion, we say that when a co-occurrence object is created, one of its activities is to look for other co-occurrence objects to which it has an appropriate exclusion relationship. Also, note that a characteristic of a basic action is that two things change (i.e., there is a double and (anti-)commutative change).

These two coincident objects have the characteristic that there is a double state change between them which is characteristic of an action.

Figure 5:
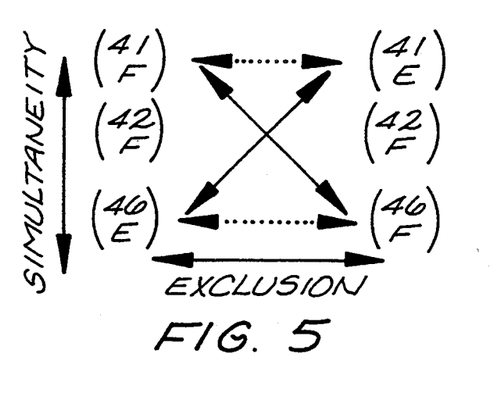
FIG. 5 is a state transfer diagram showing simultaneity and exclusion for a more complex block world.

FIG. 5 shows the simultaneity and exclusion of these two co-occurrence objects. The tuple (41,f) excludes both (41,e) and (46,f). Likewise, the tuple (46,e) excludes both (46,f) and (41,e).

The action object created by the recognition of the co-exclusive relationship between these two tuples, represented as ((41,e),(42,f),(46,f))⇌((41,f),(42,f),(46,e))

is announced to the shared memory (tuple space). Unlike the 2-tuples we have seen earlier, a 3-tuple such as this is the way the system represents that in order to fill 41 (or empty 46), or vice versa, the hand must be in a particular position, as indicated by the unchanging value of sensor 42. This action can be carried out whenever all the conditions on one side or the other of the arrow are satisfied, and the result of the action will be as indicated on the opposite side of the arrow.

At this point, the system, strictly speaking, cannot be sure whether an action it just has inferred can in fact be carried out given the other actions it has accumulated in its knowledge base. It may either assume this and 'hope for the best' or seek confirmation of this fact.

Figure 6:
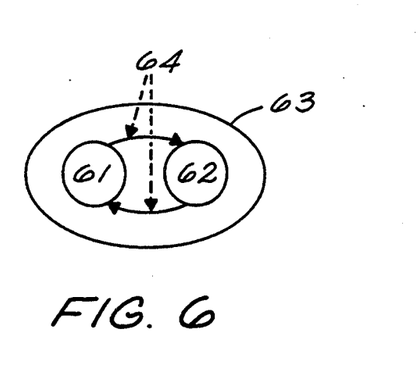
FIG. 6 shows a basic action object.

FIG. 6 illustrates this basic action object of FIG. 5. The two co-occurrence objects 61 and 62 are shown inside the action object 63. The basic actions 64 are represented by directed arcs between the co-occurrence objects 61 and 62.

Some basic information needs to be built into the system from the start to bootstrap the system. The thing that needs to be built into the system from the start is information about what specifically the pick up and the drop actions do to the states of the sensors involved, or equivalently what sensory pre-conditions and post-conditions such a primitive action has.

In the drop action, for example, the pre-conditions for dropping a block on a place X are that:
1. the place X is empty
2. the place above X is occupied by the hand
3. the hand holds the block and the post-conditions of the actions are
1. the block is on place X
2. the place above X is occupied by the hand
3. the hand is empty.

Summarizing the example to this point, it shows the application of the basic principle of combining co-exclusive co-occurrences to produce a basic action (drop/pick up). This basic action requires a primitive (built-in) level action to perform the state transformation for which it stands.

Note that the action that the system has learned, and whether it can be performed or not, does not depend on the state of (for example) place 47—whether there is a block on place 47 or not—it depends only on the state of the local fragment of the environment that it is concerned with (i.e. places 46 and 42 and hand 41).

Now assume that the same scenario has been observed, but with the hand above place 47, and hence the system has observed:

(41,e), the hand is empty, (43,f), the place above the hand is filled with the hand, (47,f), there is a block on place B as being present simultaneously, and it also has observed previously:

(41,f), there is a block in the hand, (43,f), the place above the hand is filled with the hand, (47,e), place 47 is empty as being present simultaneously. The tuples representing these co-occurrences are:

((41,e),(43,f),(47,f)) and ((41,f),(43,f),(47,e))

and the action that they create is:

((41,e)(43,f),(47,f))⇌((41,f),(43,f),(47,e)).

The two co-occurrence objects created here have the same characteristic double change as the first two co-occurrence objects presented earlier, only the position of the hand and block have changed. Again, a basic action object is created, this time capable of picking up a block from place 47 or dropping a block on place 47. These two action objects will share the primitive (built in) actions that actually make the hand grasp or release.

The process has created two basic action objects (termed: pick-up-drop-on-46 and pick-up-drop-on-47). These two objects can also be examined as to whether they can exist, or rather be active, at the same time. If the objects exclude each other, then there must be an action between them. In this example the objects do exclude each other.

One possible action or transformation between the objects is the action of moving the hand, while holding the block, from location 42 to location 43 and vice versa. The action between (42,f) and (43,f) can only be performed by a move function. Assume here that move is another built-in primitive action. The move action has no other effect than to move the hand. The contents of the hand do not change. Forming an action to capture the idea of moving the hand in order to move the block from 46 to 47 can be accomplished by noticing the co-exclusionary relationship between ((41,f),(42,f),(43,e))⇌((41,f),(42,e),(43,f))

which captures the movement of the hand from place 42 to place 43 while leaving the contents of the hand unchanged. This will as usual result in the formation of an action, and in this way the system will be able to fill 47 . . . . Thus the co-occurrence objects (created from pick-up-drop-46 and pick-up-drop-47) can get confirmation saying that:

(42,f)⇌(43,f)

is possible. Therefore the new complex object is created and it can perform the action of moving a block between places 46 and 47.

Figure 7:
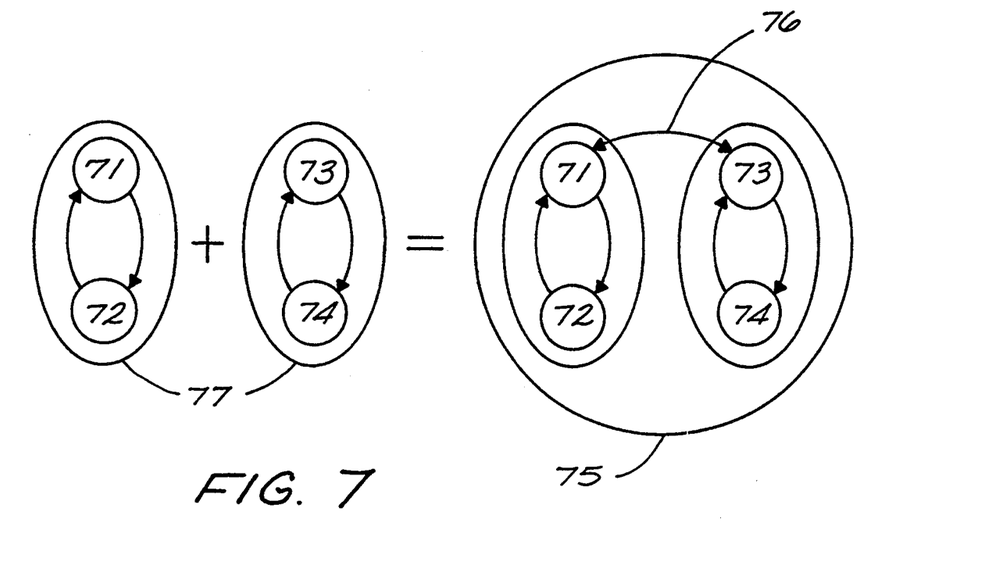
FIG. 7 shows creation of a more complex action object.

FIG. 7 illustrates the complex action object being formed. The co-occurrence object 71 represents the block in the hand at position 42. The co-occurrence object 72 represents the block on position 46 and hand in position 42. The co-occurrence object 73 represents the block in the hand at position 43, and the co-occurence object 74 represents the block on position 47 and hand in position 43. The action object 75 shows the two basic action objects 77 combined with the primitive move action 76 (shown as a directed arc between 71 and 73).

If there existed a similar action for moving a block between places 47 and 48, then the two actions could be combined to form an even more complex action. This more complex action would be able to move a block between places 46 and 48 with an intermediate action that drops the block on 47 and picks it up immediately after. This superfluous intermediate action can be removed by a plan optimizer and in some embodiments, would not even occur.

These situations only consider co-occurrences among three sensory inputs and only consider binary combinations of objects. In general, co-occurrences of N sensory inputs must be considered, as well as object combinations other than binary ones. Those of ordinary skill in the art readily visualize the application of the same principles to more involved systems.

Figure 8:
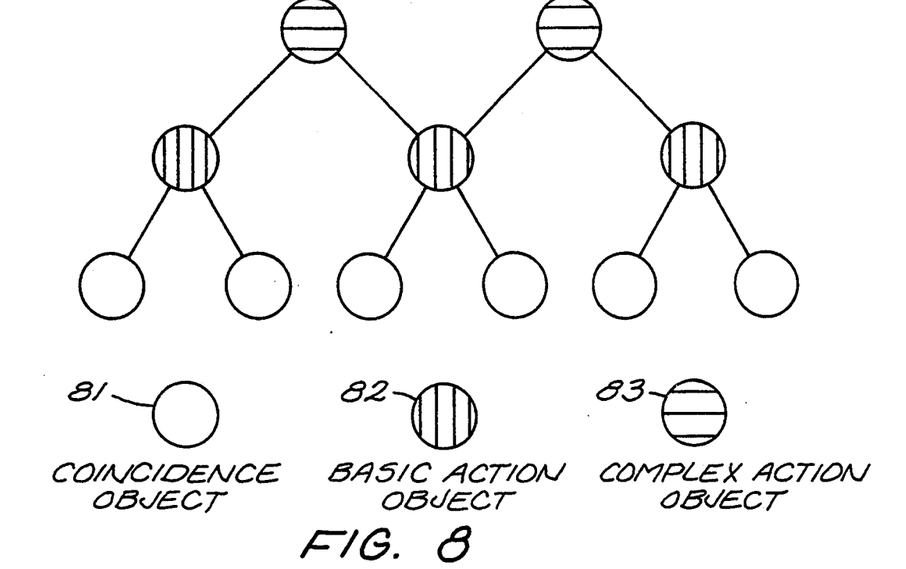
FIG. 8 shows a hierarchy of action objects.

FIG. 8 shows how co-occurrence objects 81 and action objects 82 and 83 implicitly combine, by virtue of their preconditions and exclusionary relationships, to form a hierarchy. The particular hierarchy obtaining at a particular instant of time depends of course on the current state of the world, as this determines which actions' preconditions are satisfied.

Figure 9A:
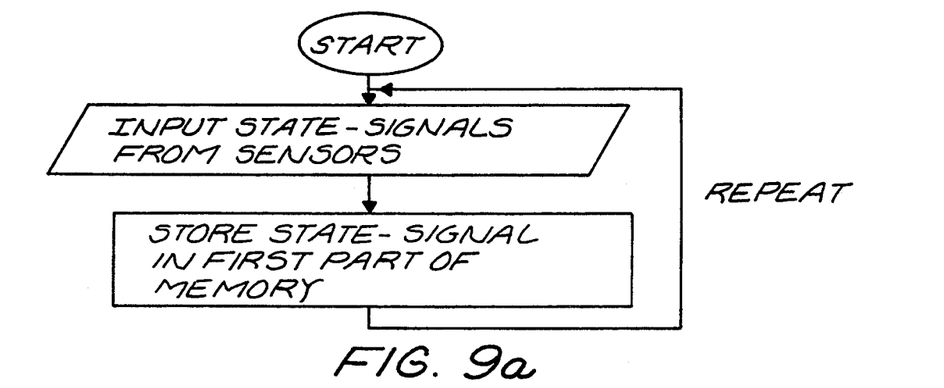
FIGS. 9a, 9b, and 9c are flowcharts illustrating the major processes of the preferred embodiment.
Figure 9B:
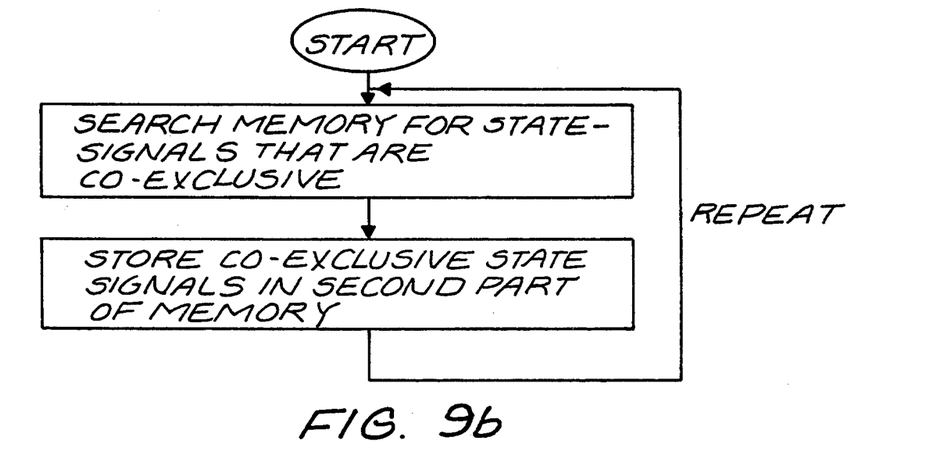
Figure 9C:
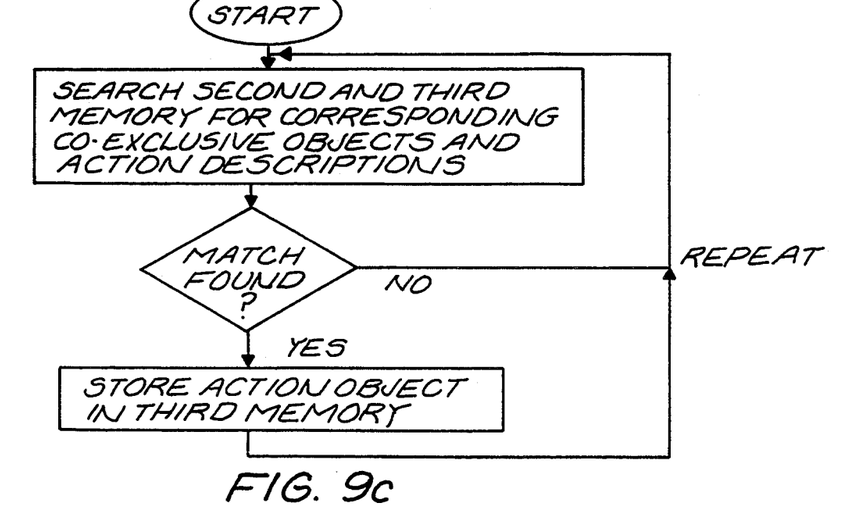

FIGS. 9a through 9c show the basic flowcharts for some of the major processes in the system. FIG. 9a shows the continuous process of inputing state-signals from the sensors and storing them in a first part of memory. FIG. 9b shows the continuous process of searching for co-occurrences. The co-occurrences are then stored in memory. FIG. 9c shows the continuous process of searching memory for co-exclusive state-signals. The state-signals are then stored in a second part of memory. Also, FIG. 9c shows the continuous process of searching for matching co-exclusive state-signals and action descriptions. When a new match is found a new action object is created and stored in a third part of memory.

Figure 10:
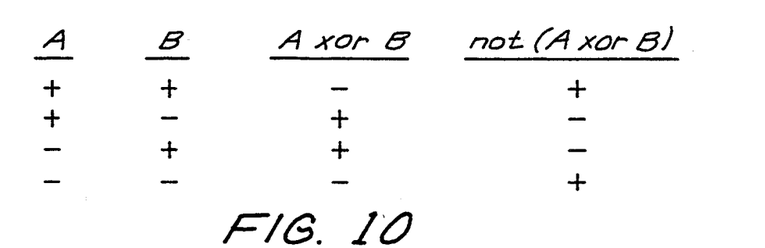

FIG. 10 shows the boolean function exclusive-or. This function is useful during the process of identifying the co-exclusive objects. When testing two objects, a table is created containing the past history of the objects. The entries are a "+" or a "−" reflecting the values of the (binary valued) sensors during that time frame. The exclusive-or function is then used to test if the functions are co-exclusive.

Figure 11:
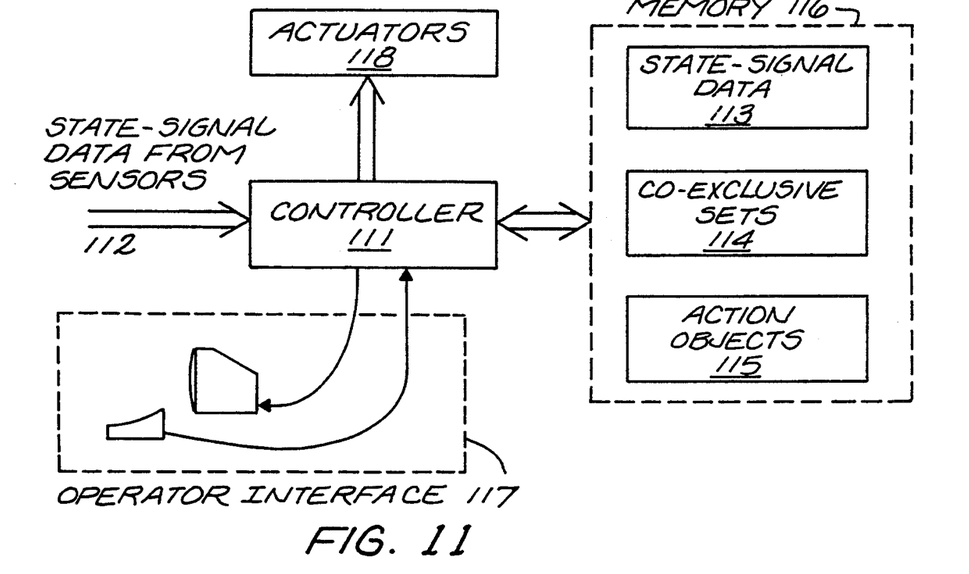
FIG. 11 is a block diagram of the preferred embodiment's hardware structure.

FIG. 11 is a block diagram of the preferred embodiment's hardware structure. The controller 111 accepts inputs of state-signal data from the sensors 112. The controller 111 stores the data in a first part of memory 113. The controller 111 also sends action commands to the actuators 118. The controller 111 accepts data and commands from the operator interface 117. The controller 111 also sends data to the operator interface 117. The controller 111 searches the memory 116 for co-exclusive sets of state-signals. Theses co-exclusive sets are stored in a second part of memory 114. The controller 111 also searches memory 116 for corresponding co-exclusive sets and action descriptors that are combined into action objects and stored in a third part of memory 115.

Figure 12:
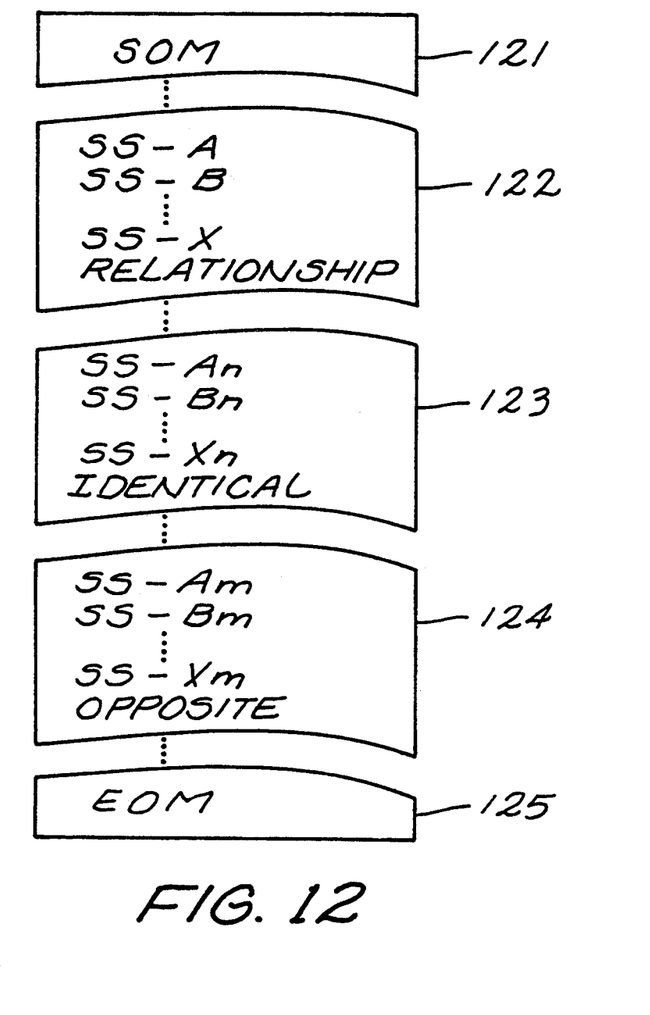
FIG. 12 is a diagram detailing the memory storage of sets which are consistent.

FIG. 12 is a diagram detailing the memory storage of sets which are consistent (i.e. co-occurrences). The diagram shows the start of memory 121 followed by a memory block 122. Memory block 122 shows the state signals in the consistent sets. SS-A, SS-B and SS-Z represent state-signal data from sensors A, B and Z respectively, where there could be any number of sensors between B and Z.

Memory block 123 shows the state signal data from the sensors which are identical between the sets. Memory block 124 shows the state signal data from the sensors which are opposite between the sets. The end of memory block 125 represents the end of memory used to store this data. The memory blocks 126 represent other memory blocks similar to the one described above.

It is clear from the forgoing that the present invention provides for a new and improved method to mechanically analyze and conceptualize a space-time domain.

What is claimed is:

1. An automated analysis apparatus comprising:
    a) at least two sensor means, each of said sensor means having at least two states, each of said sensor means generating a state-signal indicative of the state of said sensor means;
    b) memory means for storage of the state-signals from said sensor means in a first location in said memory means; and,
    c) control means having means for,
        1) identifying sets of sensor means wherein the state of each sensor means in said set is in a co-exclusion relationship to each other; and,
        2) storing, in a second location of said memory means, data indicative of said sets of sensor means.

2. The automated analysis apparatus as claimed in claim 1 wherein said sensor means can generate state-signals indicative of states internal to the apparatus.

3. The automated analysis apparatus as claimed in claim 2 wherein said means for identifying said sets of sensor means includes:
    a) means for creating a table in said memory means identifying a relationship of states of selected combinations of said at least two sensors over a time domain; and,
    b) means for associating sensor means in which the relationship of states is consistent over the time domain.

4. The automated analysis apparatus as claimed in claim 3 wherein said means for creating includes means for detecting when sets of sensory data values gathered at different times differ from each other in order to establish the co-exclusion relationship between them.

5. The automated analysis apparatus as claimed in claim 3 wherein said control means has means for updating elements in said memory means each time frame.

6. The automated analysis apparatus as claimed in claim 5 wherein said updating of said memory means includes forming a new table of relationships of states.

7. The automated analysis apparatus as claimed in claim 6 further including at least one actuator means for affecting an external environment which influences said at least one of said sensor means and wherein said control means has means for controlling said actuator means.

8. The automated analysis apparatus as claimed in claim 7 wherein said control means further includes means for:
    a) correlating the actions of said actuator means with corresponding changes in said sets of sensor means; and,
    b) means for storing descriptions of said actions and sets of sensor means in a third location of said memory means.

9. The automated analysis apparatus as claimed in claim 8 wherein said control means has means for:
    a) hierarchically combining said action objects into more complex action objects; and,
    b) storing said complex action objects in said third location in said memory means.

10. The automated analysis apparatus as claimed in claim 9 further including an operator interface means for communicating data from an operator to said control means and data from said control means to said operator.

11. The automated analysis apparatus as claimed in claim 6 wherein said sets of sensor means in said second memory include identification data indicative of the consistent relationship identified for each set of sensor means.

12. The automated analysis apparatus as claimed in claim 11 wherein said identification data is indicative of a condition wherein the state of each sensor within a set of sensor means are identical.

13. The automated analysis apparatus as claimed in claim 11 wherein said identification data is indicative of a condition wherein the state of each sensor within a set of sensor means are not identical.

14. An automated analysis apparatus comprising:
 a) at least two sensor means, each of said sensor means having at least two states, each of said sensor means generating a state-signal indicative of the state of said sensor means;
 b) memory means for storage of the state-signals from said sensor means in a first location in said memory means; and,
 c) control means having means for,
  1) identifying sets of sensor means wherein the state of each sensor means in said set is in a co-exclusive relationship to each other, said means for identifying sets including,
   A) means for creating a table in said memory means identifying a relationship of states of selected combinations of said at least two sensors over a time domain, and,
   B) means for associating sensor means in which the relationship of states is consistent over the time domain, and,
  2) storing, in a second location of said memory means, data indicative of said sets of sensor means.

15. The automated analysis apparatus as claimed in claim 14 wherein said sensor means can generate state-signals indicative of states internal to the system.

16. The automated analysis apparatus as claimed in claim 15 wherein said means for creating includes means for applying a boolean operation of exclusive-or to said states of said at least two sensors over a time domain.

17. The automated analysis apparatus as claimed in claim 16 wherein said control has means for updating elements in said memory means each time frame.

18. The automated analysis apparatus as claimed in claim 17 wherein said updating of said memory means includes forming a new table of relationships of states.

19. The automated analysis apparatus as claimed in claim 18 further including at least one actuator means for affecting an external environment which influences at least one of said sensor means and wherein said control means has means for controlling said actuator means.

20. The automated analysis apparatus as claimed in claim 19 wherein said control means further includes means for:
 a) correlating the actions of said actuator means with corresponding changes in said sets of sensor means; and,
 b) means for storing descriptions of said actions and sets of sensor means in a third location of said memory means.

21. The automated analysis apparatus as claimed in claim 20 wherein said control means has means for:
 a) hierarchically combining said action objects into more complex action objects; and,
 b) storing said complex action objects in said third location in said memory means.

22. The automated analysis apparatus as claimed in claim 21 further includes an operator interface means for communicating data from an operator to said control means and data from said control means to said operator.

23. A method of operating an automated analysis apparatus having at least two sensors, said method comprising the steps of:
 a) generating a state-signal indicative of a state of each sensor;
 b) storing the state-signals from said sensor means in a first location of a memory means;
 c) identifying sets of sensor means wherein the state of each sensor means in said set is in a co-exclusive relationship to each other; and,
 d) storing, in a second location of said memory means, data indicative of said sets of sensor means.

24. The method according to claim 23, wherein prior to the step of storing, the method includes the steps of:
 a) creating a table in said memory means identifying a relationship of states of all combinations of said at least two sensors occurring over a time domain; and,
 b) associating sensor means in which the relationship of states is consistent over the time domain.

25. The method according to claim 24 wherein the step of creating a table includes the step of applying a boolean operation of exclusive-or to said states of said at least two sensors over a time domain.

* * * * *